US008527379B2

(12) United States Patent
Rajan et al.

(10) Patent No.: US 8,527,379 B2
(45) Date of Patent: *Sep. 3, 2013

(54) METHOD AND APPARATUS PERTAINING TO METRICS-BASED PRIORITIZATION OF BILLING EXCEPTIONS (75) Inventors: Seshadhri Pakshi Rajan, Belmont, CA (US); Matthew Carl Hamilton, Pacifica, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,839

(22) Filed: Aug. 28, 2012

(65) Prior Publication Data
US 2012/0323611 A1 Dec. 20, 2012

Related U.S. Application Data (63) Continuation of application No. 12/636,298, filed on Dec. 11, 2009, now Pat. No. 8,280,792.

(51) Int. Cl.
*G07F 19/00* (2006.01)
*H04M 15/00* (2006.01)
*G06Q 30/04* (2012.01)
*G06Q 40/00* (2012.01)
*G06Q 20/10* (2012.01)
*G06Q 20/14* (2012.01)
*G06Q 30/02* (2012.01)

(52) U.S. Cl.
CPC ............... *G06Q 30/04* (2013.01); *G06Q 40/10* (2013.01); *G06Q 20/102* (2013.01); *G06Q 20/14* (2013.01); *G06Q 30/0283* (2013.01)

USPC ................................................ 705/34; 705/4

(58) Field of Classification Search
CPC ....... G06Q 30/04; G06Q 40/10; G06Q 20/14; G06Q 20/102; G06Q 30/0283
See application file for complete search history.

(56) References Cited

U.S. PATENT DOCUMENTS 7,280,971 B1  10/2007  Wimberly et al.
7,685,006 B2 *  3/2010  Rahn et al. ......................... 705/3
(Continued)

OTHER PUBLICATIONS

Myhr et al., "Insurance Operations, Regulation, and Statutory Accounting", Sep. 2003, American Institute for Chartered Property Casualty Underwriters/Insurance Institute of America, ISBN 0-89463-124-1, Chapter 4.

(Continued)

*Primary Examiner* — Luna Champagne
(74) *Attorney, Agent, or Firm* — Van Pelt, Yi & James LLP (57) ABSTRACT Insurance billing includes receiving a plurality of exceptions arising out of one or more billing events and associated with one or more billed parties; categorizing the plurality of exceptions into a plurality of exception groups based at least in part on one or more types of exceptions; determining, for an exception group corresponding to a particular type of exception, a plurality of exception metrics for each of one or more corresponding billed parties; presenting, to the user, a selectable plurality of exception groups; and in response to a user selection of a particular exception group, presenting to the user one or more billed party identifiers of the one or more corresponding billed parties in the particular exception group and the plurality of exception metrics determined for each of the one or more corresponding billed parties.

40 Claims, 4 Drawing Sheets

(56) References Cited

U.S. PATENT DOCUMENTS

| | | |
|---|---|---|
| 2002/0123983 A1 | 9/2002 | Riley et al. |
| 2006/0271399 A1 | 11/2006 | Robson et al. |
| 2007/0016911 A1 | 1/2007 | Cyktor et al. |
| 2011/0112851 A1* | 5/2011 | Poley .............................. 705/2 |

OTHER PUBLICATIONS

Property and Casualty Insurance: License Exam Manual—7th Edition, 2004, Dearborn Financial Publishing, Inc., USA, ISBN 0-7931-8801-6, Chapter 2.

* cited by examiner

Agency Bill Exceptions: Eric Michaels

Payment Mismatch Exceptions (0) | Promise Mismatch Exceptions (1) | Late Payments (0) | Late Promises (0)

Edit / History | Carry Forward | Override Commission | Edit Comments

| ☐ | Statement # | Statement Date | Create Date | Item | Policy # | Policy Eff Date | Account # | Due Date | Issue | Gross Difference | Commission Difference | Comments |
|---|---|---|---|---|---|---|---|---|---|---|---|---|
| ☐ | 7831814649 | 01/30/2009 | 01/13/2009 | Down Payment — Premium | Policy 001 | 01/13/2009 | 2078287420 | 02/24/2009 | Gross Mismatch | $500.00 | $60.00 | |
| | | | | | | | | | Total | $500.00 | $60.00 | |

METHOD AND APPARATUS PERTAINING TO METRICS-BASED PRIORITIZATION OF BILLING EXCEPTIONS

RELATED APPLICATIONS

This application is related to co-pending and co-owned U.S. patent application Ser. No. 12/631,386, entitled METHOD AND APPARATUS PERTAINING TO PROVISION AND USE OF A UNIFIED ACCOUNT CURRENT AND STATEMENT BILLING WORKFLOW and filed Dec. 4, 2009, which is incorporated by reference in its entirety herein.

TECHNICAL FIELD

This invention relates generally to computer-based billing systems.

BACKGROUND

Billing comprises a well-understood area of endeavor. Generally speaking, "billing" refers to activities to determine, and support the receipt of, amounts that are due in exchange for goods or services. This often comprises one or more acts to provide notice to a billed party regarding compensation that is presently due and payable. "Billing" can also include follow-up actions pertaining to the processing of received responses and/or late or incorrect responses. Digital computing platforms are often employed to facilitate billing activities for a gives entity.

Insurance carriers often provide their products to end users via an intermediary agency. This agency may comprise essentially airy legally-recognized entity ranging from a private individual to a partnership, corporation, or the like. Pursuant to such arrangements the agency typically receives payments from the end users and then provides some or all of these receipts to the carrier while either retaining a portion as their commission or receiving a return payment from the insurance carrier as a commission. (Brokers sometimes also have a similar relationship to insurance carriers. Although sometimes this description will use the more generic expression "producers" to refer to both agencies and brokers, it should be understood that for billing purposes "agencies" and "brokers" are sufficiently similar to one another that a specific reference to one in this description shall also comprise a reference to the other.

There have traditionally been two distinct approaches by which such an agency will make eventual payment on their agency bill policies to a carrier in the insurance industry. Pursuant to a first approach, often referred to as a statement-billing approach (and sometimes referred to as a company bill or a broker bill), the carrier calculates a bill and forwards the bill to the agency. The carrier then receives a corresponding payment from the agency. Frequently the received payment does not correspond exactly to the statement as a result of disagreements about commission amounts, terms of service, effective dates of the policy, claims made, and many other possible factors. In these eases an extensive negotiation and resolution process typically follows.

Pursuant to a second very-different approach, often/referred to as an, account-current approach the agency calculates the payment and forwards to the earner an expected promise to pay an identified amount. The carrier is responsible for examining the promise to pay, notifying the agency of any discrepancies between the promise and the carrier's expectation (discrepancies may arise for many of the same reasons as described in the case of statement-billing), and engaging with the agency to resolve the discrepancies. Later, the agency makes good on this promise (typically updated after resolving the discrepancies) and makes the corresponding payment to the carrier.

Such billing approaches, taken separately or together, present a considerable number of different expectations and actions. This, in turn, gives rise to a large number of possible ways that a given biding scenario can deviate from an expected scenario. The management of such deviations, sometimes referred to as exceptions management, presents a significant challenge. While computer-based billing systems can excel at tracking billing-related exceptions, to date such systems have not excelled at making this information especially useful to the end user. In particular, it can be easy to swamp an end user with a considerable amount of information that, by its very volume and via a typically amorphous presentation, can lead to a poor utilization of management and follow-up resources.

BRIEF DESCRIPTION OF THE DRAWINGS

The above needs are at least partially met through provision of the method and apparatus pertaining to metrics-based prioritization of billing exceptions described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field asset forth above except where different specific meanings have otherwise been set forth herein.

DETAILED DESCRIPTION

Generally speaking, pursuant to these various embodiments, a computer-based billing system presents, via an end-user interface, a plurality of exceptions as have occurred with respect to corresponding billing events as pertain to a plurality of billed parties while also presuming exceptions metrics as pertain to this plurality of exceptions. These exceptions metrics include at least one age-related metric, at least one financial-related metric, and at least one count-related metric.

These teachings then further provide for permitting the end user to selectively prioritize the presenting of the plurality of exceptions as a function of at least one of these exceptions metrics.

These teachings will accommodate a variety of exceptions metrics. Examples include, bat are not limited to, dates as pertain to an oldest corresponding exception, a total number of corresponding exceptions, an age in days of the oldest corresponding, exception, an age in days of a most recent corresponding exception, an aggregated monetary amount as pertains to one or more of the corresponding exceptions, and so forth.

By one approach the plurality of exceptions are presented in groups of exceptions as pertain to exception type. Examples of potentially appropriate exception types include, but are not limited to, overdue payments, overdue promises to make a payment, unapplied payments, received-payment discrepancies, received-promise discrepancies, suspense payments, and so forth. When presenting exceptions in a grouped manner, these teachings will, also accommodate presenting billed-party identifiers as correspond to a presently-selected group of exceptions.

By yet another approach, these teachings will accommodate selectively presenting actions that an end user can select with respect to a given exception. If desired, the presented action(s) can be limited to only contextually-appropriate actions that an end user can suitable select with respect to a given exception.

By yet another approach, the computer-based billing system can further calculate benchmark values for one or more of the aforementioned exceptions metrics. These calculated benchmark values can then be presented to the end user and/or otherwise utilized to facilitate tracking bill-paying performance of one or more of the billed parties (for example, by comparing billed-party performance against such a benchmark value).

In many application settings an unsettled amount (a type of exception) that is older than 90 days can reflect badly on an insurance company's financial statements. In such a setting we have determined that it would be invaluable if a computer-based billing system can identify to the end user specific exceptions that are about to fail into this category.

Comparing actual exceptions against benchmarks will, also permit one to group the exceptions into categories such as (bat not restricted to) high-risk, medium-risk, and low-risk groups. These could be visually identified for the end user in any of a variety of ways, including by use of color codes (such as red, amber, green, respectively) to make these groups dearly visible via the end-user interface. So configured, these benchmarks act as thresholds that facilitate the categorizing task. These benchmarks, however, ate themselves configurable An insurance carrier can therefore customize these benchmarks to account, for example for how long it typically takes for this particular carrier to resolve such disputes/exceptions.

So configured, these teachings permit a potentially wide-ranging variety of bill-paying exceptions information to be presented in a manner that enhances the ability of the end user to make efficient use of that information. These results are due, at least in part, to the relatively intuitive interface by which the end user can select to view and to prioritize the information to ensure that their own particular management responsibilities are best facilitated. These teachings are readily employed with existing data types and fields and do not occasion any particular special needs or requirements in these regards.

By another approach, these exceptions can be categorized according to the level, of expertise required to handle them. Exceptions that ate old and large in monetary amount could be automatically brought to the attention of a senior billing representative or to the billing supervisor.

Figure 1:
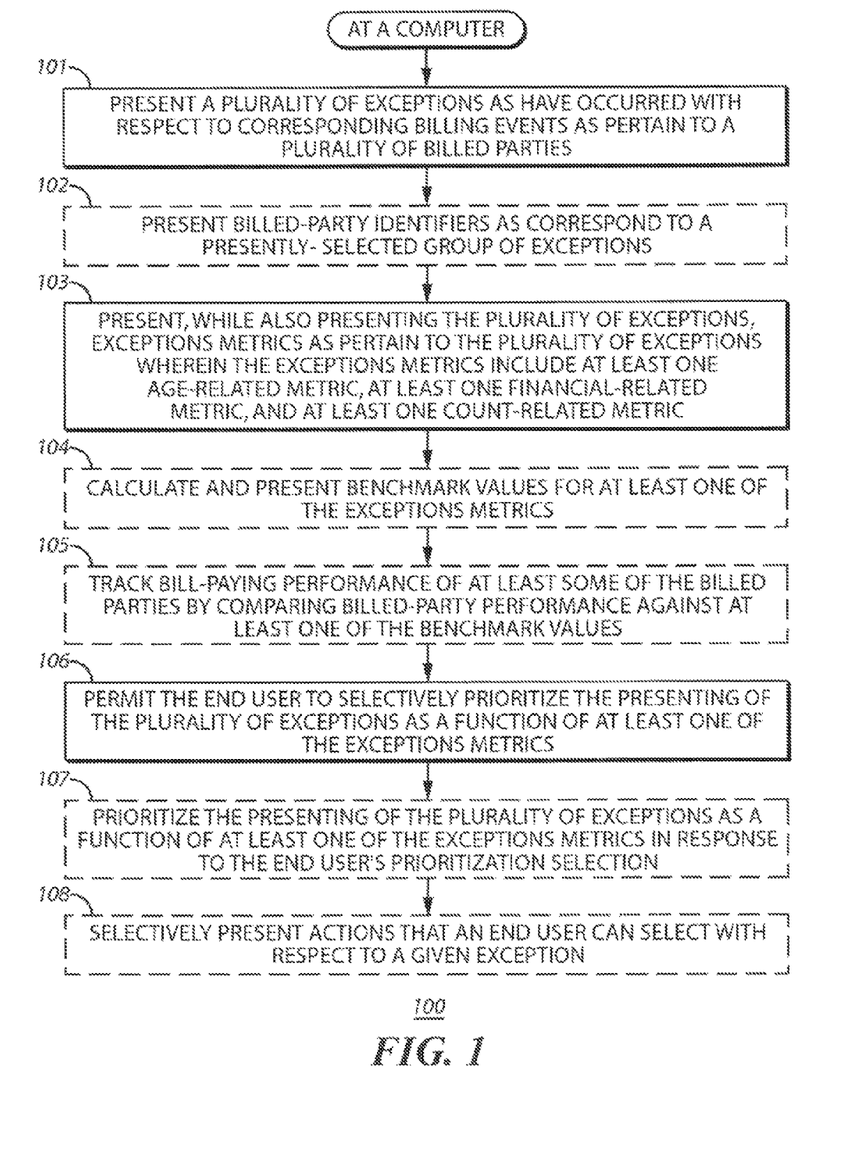
FIG. 1 comprises a flow diagram as configured in accordance with various embodiments of the invention.

These and other benefits may become clearer upon making a thorough, review and study of the following detailed description. Referring now to the drawings, and in particular to FIG. 1, an illustrative process 100 that is compatible with many of these teachings will now be presented.

This process 100 can be carried, out by a computer-based billing system of choice. With momentary reference to FIG. 2, such a system, can comprise at least one processor 201 that can be programmed to execute a set of computer instructions to effect one or more of the steps, actions, and/or functionalities described herein. This processor 201 can comprise any of a wide variety of available and/or readily-configured platforms, including fixed-purpose hard-wired platforms or partially or wholly-programmable platforms as are known in the art or dedicated purpose platforms as may be desired for some applications. All of these architectural options are well known and understood in the art and require no further description here.

Figure 2:
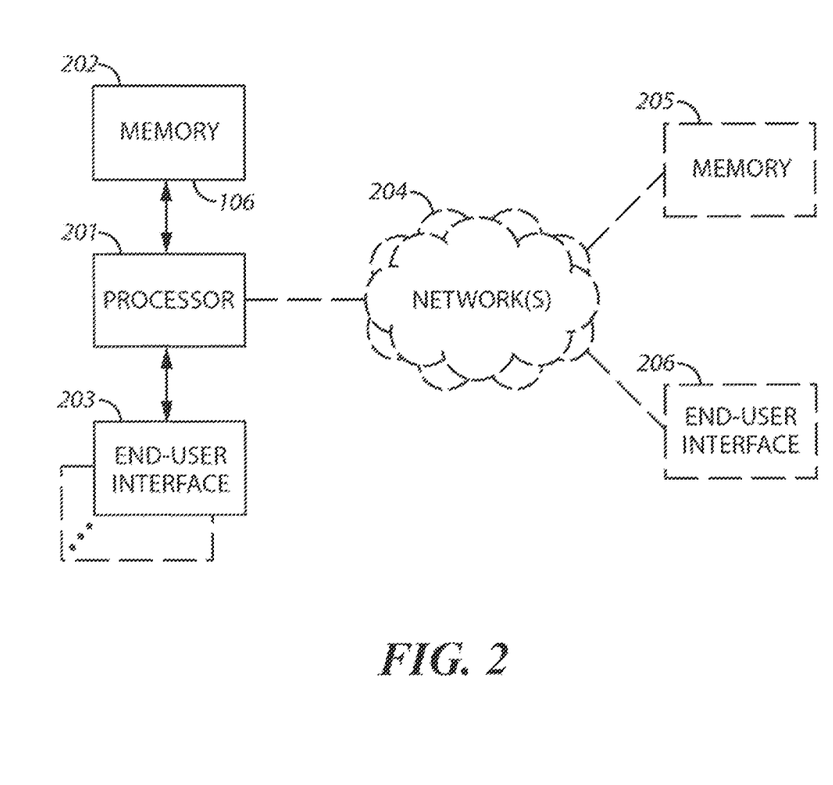
FIG. 2 comprises a block diagram as configured in accordance with various embodiments of the invention.

This processor 201 operably couples to a memory 202. This memory 202 can comprise one or more physically discrete components as compared to die processor 201 or can, if desired, comprise an integral part of the processor 201 platform. This memory 202 can contain the aforementioned set of computer instructions and/or other information relevant to carrying out the described process 100.

The processor 201 can also operably couple to an end-user interlace 203 of choice (including a plurality of similar or dissimilar end-user interfaces as appropriate to suit, the needs of a given application setting). This end-user interface 203 can serve as a platform for rendering information to be consumed by an end user (such as an active display, an audio speaker, and so forth) and also a platform to receive inputs from the end user (such as a keyboard and/or keypad, a cursor-control device, a touch screen, a voice recognition microphone, and so forth). Various such end-user interfaces are known in the art. As these teachings are not particularly sensitive to any number of choices in these regards, further elaboration will not be provided here for the sake of brevity.

These teachings will readily accommodate optionally coupling the processor 201 to one or more communication networks 204 (such as wired or wireless local area networks, wide area networks, and extranets such as the internet). This, in turn, can provide a pathway by which the processor 201 can communicate with remotely-located memories 205, end-user interfaces 206, and so forth.

Referring again to FIG. 1, step 101 comprises presenting (for example, via one or more of the aforementioned end-user interlaces) a plurality of exceptions as have occurred with respect to corresponding billing events as pertain to a plurality of billed parties. (References to "billing" and the like shall be understood to refer to any of a variety of billing paradigms including but not limited to the aforementioned statement-billing and account-current approaches. Accordingly, this specific reference to a "billed party" will be understood to refer to parties who receive bills as well as to parties who, pursuant to a previously agreed-upon billing plan, themselves initiate presenting a promise regarding a future payment that they plan to make.) For the sake of illustration and without intending any limitations in these regards, it will be presumed here that these billed parties are insurance policy producers (such, as agencies or brokers).

The aforementioned billing events can comprise any billing events as suit the needs and/or opportunities of a given application setting. Non-limiting illustrative examples would include sending a bill, receiving a payment, receiving a promise to make a future payment, and so forth.

The exceptions, in tarn, can also comprise any billing event discrepancies of choice. Non-limiting illustrative examples would include an overdue payment, an overdue promise to make a payment, an unapplied payment, a received-payment discrepancy (where, for example, a received payment is less or more than an expected payment amount), a received-promise discrepancy (where, for example, a received promise promises to pay an amount that is less or more than an expected amount), and a suspense payment (an amount that is paid in advance and waiting to be applied to a new charge that is not yet in the billing system). By one approach, the presented exceptions can comprise at least one of each of the exception types enumerated above.

By one approach, this step 101 can comprise presenting these exceptions as groups of exceptions. This can comprise, for example, grouping the exceptions by exception type and presenting the results as identifiable corresponding groups. Referring momentarily to the screen shot 300 show in FIG. 3, and as one illustrative example in these regards, a file-folder paradigm, can be utilized to distinguish one group of exception types from another, in this particular non-limiting illustrative example, the available groups are denoted, as "producers with payment exceptions," "producers with promise exceptions," "unapplied payments," "late payments," "late promises," and "suspense payment items." By this approach, when the end user selects a particular file the system, responsively presents the informational contents of that selected file.

Figure 3:
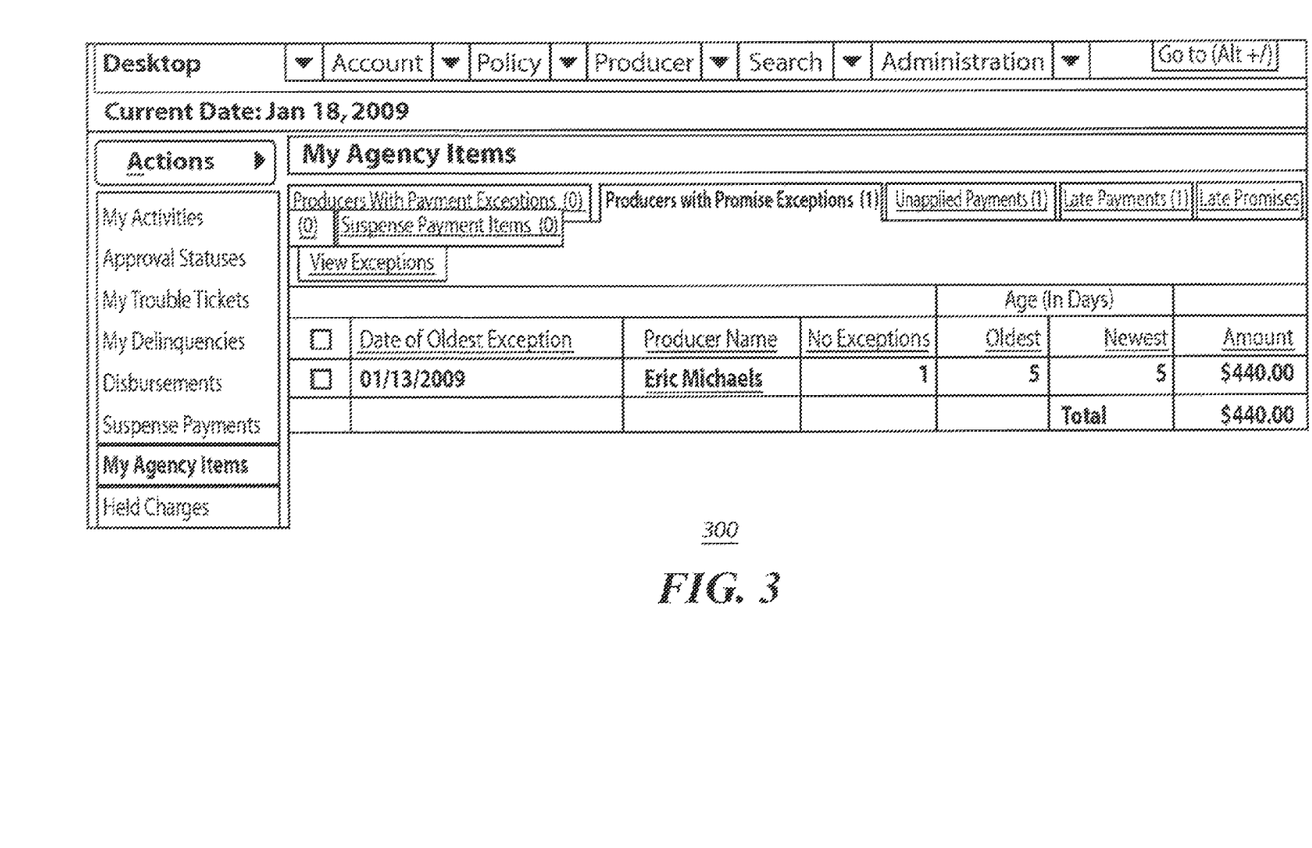
FIG. 3 comprises a screen shot as configured in accordance with various embodiments of the invention.

Referring now to both FIG. 1 and 3, an optional step 102 provides for presenting billed-party identifiers as correspond to at least a presently-selected group of exceptions. These identifiers can comprise, for example, a name of the producer (such as "Eric Michaels" in the example shown in FIG. 3), a coded moniker (such as a producer number), or any other mechanism that will serve in a given application, setting to identify a particular billed party. In this particular example, only the identifiers as correspond to the selected group of exception types are presented. Other possibilities in these regards of course exist.

In any event, at step 103 this process 100 provides for also presenting exception metrics as pertain, to the plurality of exceptions. These exception metrics are presented while also presenting the plurality of exceptions (though this does not necessarily require simultaneously presenting all possible exceptions and ail possible exception metrics as space and/or context as pertain to a given application setting may mitigate against such an approach).

Figure 4:
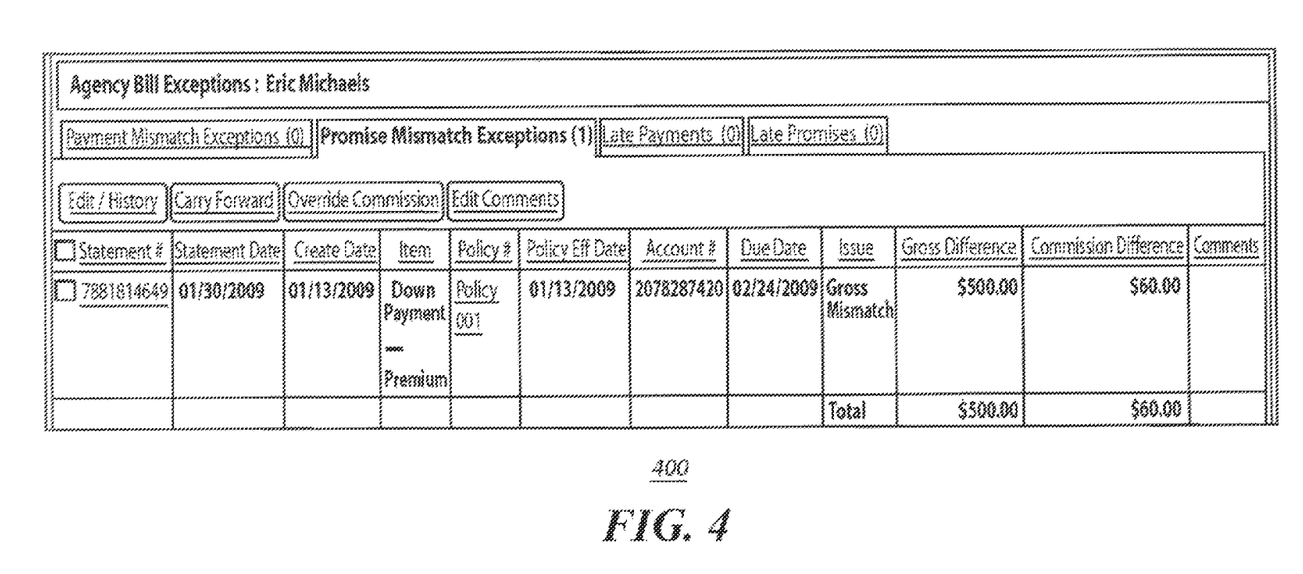
FIG. 4 comprises a screen, shot as configured in accordance with, various embodiments of the invention.

Although those teachings will accommodate using a wide variety of exceptions metrics, at a minimum this step 103 comprises (and as FIG. 4 illustrates) presenting at least, one age-related metric, at least one financial-related metric, and at least one count-related metric. Examples in these regards include a date as pertains to an oldest corresponding exception, a total number of corresponding exceptions, an age, in days, of the oldest corresponding exception, an age, in days, of a most recent corresponding exception, and an aggregated monetary amount as pertains to the corresponding exceptions, to note but a few. By one approach this step can provide for presenting each of these enumerated exceptions metrics.

To be clear with respect to the provided, illustrative, examples, in the screen shot 300 of FIG. 3 the end user has selected me exceptions group denoted as "producers with promise exceptions." The "1" in the parenthesis associated with this file indicates that there is only one billed party having an exception in this group and that billed party is identified as "Eric Michaels." This exception is dated as of Jan. 13, 2009. As the date of this viewing is shown in the upper left-hand corner of the screen shot 300 as being Jan. 18, 2009, a period of five days has elapsed since the exception occurred. This screen shot 300 also presents the number of exceptions for this billed party ("1" in this simple example) and the age in days of the oldest and the newest exceptions (since there is only the one exception, in this example, this, is "five" days for both). This semen shot 300 also presents the monetary value of this particular exception ($440.00) and the aggregate value of all of the exceptions for this billed party (which of course also equals $440.00 in this example as there is only the one exception to account for).

To reach the screen shot 400 shown in FIG. 4, the end user has clicked on (or otherwise selected) the identifier for the billed party ("Eric Michaels") as shown, in FIG. 3. By taking this action the end user can view additional details regarding the exceptions for this particular billed party. This includes, in this illustrative example, information regarding the corresponding statement number, the statement date, die specific item, or items at issue, the insurance policy number, the effective date for the policy, the account number, the due date, the specific issue or issues, and relevant differences as pertain to any corresponding commissions. This view also provides an opportunity to include other ad hoc comments that an end user might find helpful.

Referring now again to FIG. 1, optional step 104 provides for calculating one or more benchmark, values for at least one of the exceptions metrics and then presenting one or more of those benchmark values via the end-user interface. These benchmark values can be calculated from time to time or at a moment of need. These benchmark values can also be calculated using whatever statistically-interesting population may be of interest. For example, benchmark values for an exception metric such as an oldest date for a given exceptions group can be calculated using all presently available "oldest dates" in the system Regardless of how such benchmark values become available, this process 100 will also accommodate the optional step 105 of tracking bill-paying performance of at least Some of the billed parties by, for example, comparing billed-party performance against one or more of these benchmark values. Such a step 105 can further comprise, if desired, providing an indication to the end user (via the end-user interface, for example) in response to when the bill-paying performance of a given billed party compares inappropriately to one or more of these benchmark values. As one simple example, the system could sum all "oldest dates" for all exceptions for all bill payers and then determine an average value as a corresponding benchmark value. An indication could then be provided to the end user to identify all of the exceptions that are older than this benchmark value. This, of course, could aid the end user in best prioritizing their attention to address those exceptions that are most temporally egregious.

In any event, this process 100 provides, at step 106, an opportunity via the end-user interface to permit an end user to selectively prioritize the presenting of the plurality of exceptions as a function of at least one of the aforementioned, exceptions metrics. This can comprise, for example, permitting the end user to select a given one of the exceptions metrics.

When the end user has in fact selectively prioritized the presenting of such exceptions, this process 100 can then further accommodate the step 107 of presenting the exceptions information as sorted as a function of the selected exceptions metric. As one simple example in these regards, if the end user selects the metric that corresponds to the oldest age, this step 107 can comprise sorting the exceptions information with the oldest exceptions appearing first and the newest exceptions appearing last. As another simple example in these regards, if the end user selects ate metric that corresponds to the monetary value of the exception, this step 107 can comprise sorting the exceptions information with the exceptions having the largest, corresponding monetary value appearing first and the exceptions having the smallest corresponding monetary value appearing last.

Such actions cars aid the end user in quickly and efficiently identifying exceptions that should first be addressed (as per the particular priorities and concerns of the end user). This process 100 will also support, however, permitting the end user to take particular actions as pertain to those prioritized and presented exceptions. An optional step 108, for example, will provide for the presentation of one or more actions that the end user can select with respect to a given exception. Exemplary actions include, but are not limited to, editing the corresponding exception, carrying the exception forward, overriding a corresponding commission, writing off a corresponding amount, and beginning a delinquency process, to note but a few.

As noted earlier, billing practices and their corresponding exceptions can become both numerous and complicated. Accordingly, if desired, this step 108 of presenting actions can be limited to presenting only contextually-appropriate actions that an end user can in fact usefully select with respect to a given exception. For example, when viewing the "payment mismatch" exceptions (which is a type of exception), some illustrative contextually-appropriate actions would be to write-off the discrepancy or to carry forward the exception (i.e., a decision to resolve the exception in the next monthly cycle). As another example, when looking at "late payment exceptions" (another type of exception), illustrative appropriate actions can include dismissing the exception (which may be appropriate when the amount in question comprises only a small, amount) and starting a delinquency process with respect to the late payment items. So configured, the system displays only the appropriate actions for each type of exception.

So configured, a myriad of billing-process exceptions can be accommodated without necessarily over burdening the end user with such, information. By providing exceptions metrics and by permitting the end user to prioritize the presentation of the exceptions information as a function of selected exceptions metrics, a powerful and relatively intuitive tool results. Such an approach avoids forcing each end user to accept, either for the moment or as a standard operational paradigm, any particular prioritization view. This, in turn, permits each end user to access and efficiently utilize the exceptions information to accomplish their particular tasks.

In statement-billing practice at least some of the exceptions can be viewed as representing a "unit of work". These exceptions are assigned to individual statement-billing billing representatives. Resolving these exceptions, in turn, constitutes a fundamental job responsibility of an statement-billing billing representative. Therefore the number of open exceptions assigned to a representative constitutes the backlog of work that this representative is responsible to complete. The number of exceptions successfully closed by such representatives can serve to help identify the performance outliers in an organization. For example, a supervisor can look at the number of open exceptions that a given representative has, the number of closed ones in the last one month, and compare this information to a prior period and see if there is a growth in performance of the employee. By appropriately applying these teachings, annual performance reviews can be made more metrics-driven and therefore more objective. This can lead to increased satisfaction for both the supervised and the supervisors.

The average number of exceptions per billed party per billing cycle can be viewed as representing a difficulty of doing business with them. If the volume of business that a business party brings (measured, for example, in monetary terms, such as total net written premiums) is low compared to the "number of exceptions," the concerned billed party may not be deemed sufficiently successful. Writing agency bill policy is a privilege often accorded to only a few agencies with writing account current policies often representing an even higher privilege. By inspecting the number of exceptions over a given period of time, the insurance carrier can more effectively evaluate the agency and make better-informed decisions regarding the allocation and awarding of these privileges.

The average number of exceptions per billed party (across a line of book) can also serve as a good indicator of the health of the billing operation can readily evaluate the overall team's performance and also assess the complexity and cost of doing business.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. An insurance billing system, comprising:
one or more processors configured to:
receive a plurality of exceptions arising out of one or more billing events and associated with one or more billed parties, wherein a billed party is an insurance policy producer serving as an intermediary between an insurance policy carrier and an insurance policy holder, and the billed party includes an insurance policy broker or an insurance policy agency;
categorize the plurality of exceptions into a plurality of exception groups based at least in part on one or more types of exceptions;
determine, for an exception group corresponding to a particular type of exception, a plurality of exception metrics for one or more corresponding billed parties, wherein a corresponding billed party is associated with at least one exception that is of the particular type of exception;
present, to the user, a selectable plurality of exception groups;
in response to a user selection of a particular exception group, present to the user one or more billed party identifiers of the one or more corresponding billed parties in the particular exception group and the plurality of exception
metrics determined for the one or more corresponding billed parties; and a memory coupled to the one or more processors and configured to provide the processor with instructions.

2. The system of claim 1, wherein the one or more processors are further configured to:
in response to a user selection of at least one exception metric as a basis to selectively prioritize the plurality of exceptions, sort the plurality of exceptions based at least in part on the selected exception metric; and present, to the user, the plurality of exceptions as selectively prioritized based on the selected exception metric.

3. The system of claim 1, wherein the one or more processors are further configured to:
calculate at least one benchmark value for at least one exception metric;
present, to the user, the benchmark value for the exception metric.

4. The system of claim 3, wherein the benchmark value includes an average of an oldest date of all exceptions in an exception group of a particular exception type.

5. The system of claim 3, wherein the one or more processors are further configured to:
compare one or more actual exception metrics determined for a billed party with the benchmark value; and
categorize the plurality of exceptions into one or more task groups based at least in part on the comparison between the calculated benchmark values and the one or more actual exception metrics.

6. The system of claim 5, wherein the one or more processors are further configured to present, to the user, the one or more task groups using a distinct visual identifier including color codes for each task group.

7. The system of claim 1, wherein the one or more processors are further configured to:
categorize the plurality of exceptions into onto one or more levels of billing representative expertise required to handle each exception based at least in part on one or more attributes of the exception including at least one of: an age of the exception or a monetary value of the exception.

8. The system of claim 1, wherein the one or more billing events include sending a bill, receiving a payment, or receiving a promise to make a future payment.

9. The system of claim 1, wherein the one or more exception types include overdue payments, overdue promises to make a payment, unapplied payments, received-payment discrepancies, received-promise discrepancies, or suspense payments.

10. The system of claim 1, wherein the plurality of exception metrics includes at least one age-related metric, at least one count-related metric, or at least one financial-related metric.

11. The system of claim 10, wherein the age-related metric includes at least one of: a date of an oldest exception, an age of an oldest exception, or an age of a most recent exception.

12. The system of claim 10, wherein the count-related metric includes a total number of exceptions.

13. The system of claim 10, wherein the financial-related metric includes an aggregated monetary value of one or more exceptions.

14. The system of claim 1, wherein a billed party identifier for a particular billed party includes at least one of: a producer name of the particular billed party or a producer number of the particular billed party.

15. The system of claim 1, wherein the one or more processors are further configured to:
in response to a user selection of a billed party identifier, present to the user additional details of the one or more exceptions associated with a billed party identified by the billed party identifier including at least one of: a statement number, a statement date, one or more specific item at issue, an insurance policy number, an effective date for the policy, an account number, a due date, one or more specific issues, or one or more differences relating to commissions.

16. The system of claim 1, wherein the one or more processors are further configured to present, to the user, a selection of exemplary actions for a given exception including at least one of: editing the given exception, carrying the given exception forward, overriding a commission associated with the given exception, writing off an amount associated with the given exception, or initiating a delinquency process.

17. The system of claim 16, wherein the selection of exemplary actions includes contextually appropriate actions with respect to the given exception.

18. The system of claim 1, wherein the one or more processors are further configured to:
in response to a user selection of a billing representative and a first billing period, determine a first performance metric of the billing representative for the first billing period, wherein the first performance metric includes a comparison of a number of exceptions assigned to the billing representative during the first billing period and a number of exceptions resolved by the billing representative during the first billing period; and
present, to the user, the first performance metric of the billing representative for the first billing period.

19. The system of claim 18, wherein the one or more processors are further configured to:
in response to a user selection of a second billing period, determine a second performance metric for the billing representative; and
present, to the user, a comparison of the first performance metric and the second performance metric.

20. The system of claim 1, wherein the one or more processors are further configured to:
in response to a user selection of a billed party and at least one billing period, determine a privilege for the billed party based at least in part on a comparison of a measure of business volume generated by the billed party during the billing period and a number of exceptions for the billed party for the billing period, wherein the measure of business volume includes total net written premiums.

21. The system of claim 20, wherein the privilege includes at least one of: writing agency bill policy or writing account current policy.

22. The system of claim 1, wherein the one or more processors are further configured to:
compute a first average number of exceptions per billed party for a first period of time;
compute a second average number of exceptions per billed party for a second period of time; and
determine an overall billing team performance metric based at least in part on a comparison of the first average number of exceptions and the second average number of exceptions.

23. A insurance billing method, comprising:
receiving a plurality of exceptions arising out of one or more billing events and associated with one or more billed parties, wherein a billed party is an insurance policy producer serving as an intermediary between an insurance policy carrier and an insurance policy holder, and the billed party includes an insurance policy broker or an insurance policy agency;
categorizing, using one or more processors, the plurality of exceptions into a plurality of exception groups based at least in part on one or more types of exceptions;
determining, for an exception group corresponding to a particular type of exception, a plurality of exception metrics for each of one or more corresponding billed parties, wherein a corresponding billed party is associated with at least one exception that is of the particular type of exception;

presenting, to the user, a selectable plurality of exception groups; and in response to a user selection of a particular exception group, presenting to the user one or more billed party identifiers of the one or more corresponding billed parties in the particular exception group and the plurality of exception metrics determined for each of the one or more corresponding billed parties.

24. A computer program product for insurance billing, the computer program product being embodied in a non-transitory computer readable storage medium comprising computer instructions for:

receiving a plurality of exceptions arising out of one or more billing events and associated with one or more billed parties, wherein a billed party is an insurance policy producer serving as an intermediary between an insurance policy carrier and an insurance policy holder, and the billed party includes an insurance policy broker or an insurance policy agency;

categorizing the plurality of exceptions into a plurality of exception groups based at least in part on one or more types of exceptions;

determining, for an exception group corresponding to a particular type of exception, a plurality of exception metrics for each of one or more corresponding billed parties, wherein a corresponding billed party is associated with at least one exception that is of the particular type of exception;

presenting, to the user, a selectable plurality of exception groups; and in response to a user selection of a particular exception group, presenting to the user one or more billed party identifiers of the one or more corresponding billed parties in the particular exception group and the plurality of exception metrics determined for each of the one or more corresponding billed parties.

25. The method of claim 23, further comprising:
in response to a user selection of at least one exception metric as a basis to selectively prioritize the plurality of exceptions, sorting the plurality of exceptions based at least in part on the selected exception metric; and
presenting, to the user, the plurality of exceptions as selectively prioritized based on the selected exception metric.

26. The method of claim 23, further comprising:
calculating at least one benchmark value for at least one exception metric;
presenting, to the user, the benchmark value for the exception metric.

27. The method of claim 23, further comprising:
categorizing the plurality of exceptions into onto one or more levels of billing representative expertise required to handle each exception based at least in part on one or more attributes of the exception including at least one of: an age of the exception or a monetary value of the exception.

28. The method of claim 23, wherein the one or more billing events include sending a bill, receiving a payment, or receiving a promise to make a future payment.

29. The method of claim 23, wherein the one or more exception types include overdue payments, overdue promises to make a payment, unapplied payments, received-payment discrepancies, received-promise discrepancies, and suspense payments.

30. The method of claim 23, wherein the plurality of exception metrics includes at least one age-related metric, at least one count-related metric, or at least one financial-related metric.

31. The method of claim 23, further comprising:
in response to a user selection of a billed party identifier, presenting to the user additional details of the one or more exceptions associated with a billed party identified by the billed party identifier including at least one of: a statement number, a statement date, one or more specific item at issue, an insurance policy number, an effective date for the policy, an account number, a due date, one or more specific issues, or one or more differences relating to commissions.

32. The method of claim 23, further comprising presenting, to the user, a selection of exemplary actions for a given exception including at least one of: editing the given exception, carrying the given exception forward, overriding a commission associated with the given exception, writing off an amount associated with the given exception, or initiating a delinquency process.

33. The computer program product of claim 24, further comprising computer instructions for:
in response to a user selection of at least one exception metric as a basis to selectively prioritize the plurality of exceptions, sorting the plurality of exceptions based at least in part on the selected exception metric; and
presenting, to the user, the plurality of exceptions as selectively prioritized based on the selected exception metric.

34. The computer program product of claim 24, further comprising computer instructions for:
calculating at least one benchmark value for at least one exception metric;
presenting, to the user, the benchmark value for the exception metric.

35. The computer program product of claim 24, further comprising computer instructions for:
categorizing the plurality of exceptions into onto one or more levels of billing representative expertise required to handle each exception based at least in part on one or more attributes of the exception including at least one of: an age of the exception or a monetary value of the exception.

36. The computer program product of claim 24, wherein the one or more billing events include sending a bill, receiving a payment, or receiving a promise to make a future payment.

37. The computer program product of claim 24, wherein the one or more exception types include overdue payments, overdue promises to make a payment, unapplied payments, received-payment discrepancies, received-promise discrepancies, and suspense payments.

38. The computer program product of claim 24, wherein the plurality of exception metrics includes at least one age-related metric, at least one count-related metric, or at least one financial-related metric.

39. The computer program product of claim 24, further comprising computer instructions for:
in response to a user selection of a billed party identifier, presenting to the user additional details of the one or more exceptions associated with a billed party identified by the billed party identifier including at least one of: a statement number, a statement date, one or more specific item at issue, an insurance policy number, an effective date for the policy, an account number, a due date, one or more specific issues, or one or more differences relating to commissions.

40. The computer program product of claim 24, further comprising computer instructions for presenting, to the user, a selection of exemplary actions for a given exception including at least one of: editing the given exception, carrying the given exception forward, overriding a commission associated with the given exception, writing off an amount associated with the given exception, or initiating a delinquency process.

\* \* \* \* \*